(12) United States Patent
Longhurst

(10) Patent No.: US 7,289,625 B2
(45) Date of Patent: Oct. 30, 2007

(54) PORTABLE SEALABLE TELECOMMUNICATIONS EXCHANGE EQUIPMENT STRUCTURE

(75) Inventor: Philip J Longhurst, Ipswich (GB)

(73) Assignee: British Telecommunications public limited company, London (GB)

( * ) Notice: Subject to any disclaimer, the term of this patent is extended or adjusted under 35 U.S.C. 154(b) by 692 days.

(21) Appl. No.: 10/471,820

(22) PCT Filed: Mar. 14, 2002

(86) PCT No.: PCT/GB02/01213
§ 371 (c)(1),
(2), (4) Date: Sep. 15, 2003

(87) PCT Pub. No.: WO02/080580
PCT Pub. Date: Oct. 10, 2002

(65) Prior Publication Data
US 2004/0116100 A1 Jun. 17, 2004

(30) Foreign Application Priority Data
Mar. 30, 2001 (EP) ................................. 01303074

(51) Int. Cl.
*H04M 3/00* (2006.01)
*H04Q 1/06* (2006.01)
*H04Q 1/10* (2006.01)

(52) U.S. Cl. ...................................... 379/329; 379/330
(58) Field of Classification Search ......... 379/325–330
See application file for complete search history.

(56) References Cited

U.S. PATENT DOCUMENTS
4,197,434 A 4/1980 Inamasu et al. ............. 379/327

FOREIGN PATENT DOCUMENTS
GB 1160139 7/1969

OTHER PUBLICATIONS

Ardizzone et al, "System 12 Containerized Exchange", Electrical Communicaiton, Alcatel, Brussels, BE, vol. 59, No. ½, 1985, pp. 207-211, XP002053762.

*Primary Examiner*—Harry S. Hong
(74) *Attorney, Agent, or Firm*—Nixon & Vanderhye P.C.

(57) ABSTRACT

A sealable container is used as a replacement exchange building to house communications equipment. The equipment is housed in a more space efficient manner when compared with conventional exchanges and the amount of internal cabling required is significantly reduced. The entrance to the container can be sealed so that the network operator only has access to the cables leading to the transmission equipment.

5 Claims, 1 Drawing Sheet

PORTABLE SEALABLE TELECOMMUNICATIONS EXCHANGE EQUIPMENT STRUCTURE

This application is the US national phase of international application PCT/GB02/01213 filed 14 Mar. 2002 which designated the U.S.

BACKGROUND

1. Technical Field

The invention relates to structures that can be used to house communications equipment, and in particular movable structures that can be used to house communications exchange equipment.

2. Related Art

Incumbent telecommunication network operators have faced many changes to their networks: the transition from mechanical to electronic switches and then the introduction of digital switches; the replacement of copper and coaxial cables with optical fibre and the introduction of microwave and radio communication systems. These changes have all had an impact upon the use of space within exchange buildings. For example, digital electronic switches occupy significantly less floor space than the equivalent capacity of mechanical switches would do. This change has allowed network operators to either consolidate their network by aggregating exchange equipment into a smaller number of buildings or to dispose of space recovered in this manner to third parties. The result of thee change is that space in some exchange buildings is now at a premium in view of the need to add in new equipment, for example DSL (digital subscriber line) racks, aerials and equipment for cellular radio networks (the need for which will increase with the deployment of GPRS and third generation mobile systems) and terminal equipment and cabling to support the use of optical fibre in the access network. This situation is exacerbated where local line unbundling is in operation and space must be set aside for the use of other network operators.

BRIEF SUMMARY

According to a first aspect of the invention there is provided a portable structure for a communications network, the structure being sealable and comprising transmission equipment for transmitting and receiving signals and one or more transmission media for connecting said transmission equipment to a communications network, the transmission equipment being connected to a first end of one or more of the transmission media characterised in that, in use, the container is sealed and the network operator only has access to a second end of one or more of the transmission media, the second end of one or more of the transmission media being located outside the sealable structure.

The structure may have one or more entrance and the interior of the structure may be partitioned such that each entrance has a dedicated area of the interior.

In one alternative the transmission media are copper cables and the transmission equipment is digital subscriber line equipment. In a further alternative at least one of the transmission media is connected to an antenna and the transmission equipment is cellular radio transmission equipment.

Preferably the structure additionally comprises one or more housings to protect the location(s) at which one or more of the transmission media exit the interior of the structure.

BRIEF DESCRIPTION OF THE DRAWINGS

The invention will now be described, by way of example only, with reference to the following figures in which.

DETAILED DESCRIPTION OF EXEMPLARY EMBODIMENTS

Figure 1:
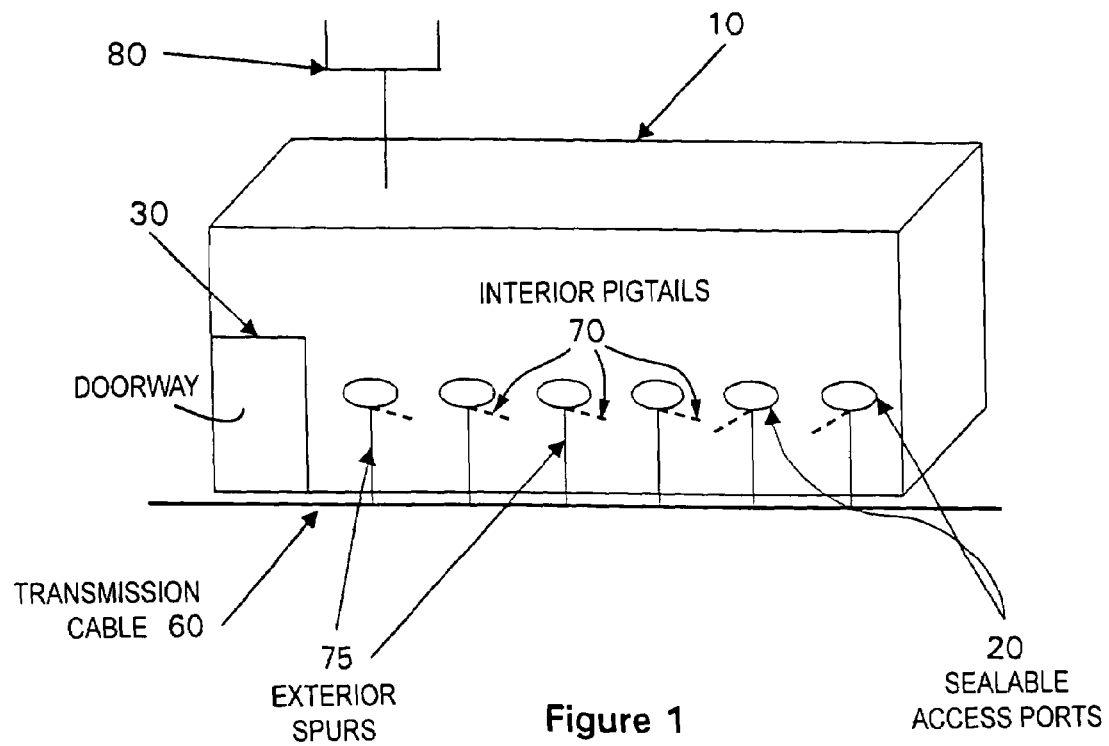
FIG. 1 shows a schematic view of the exterior of a structure according to the present invention.
Figure 2:
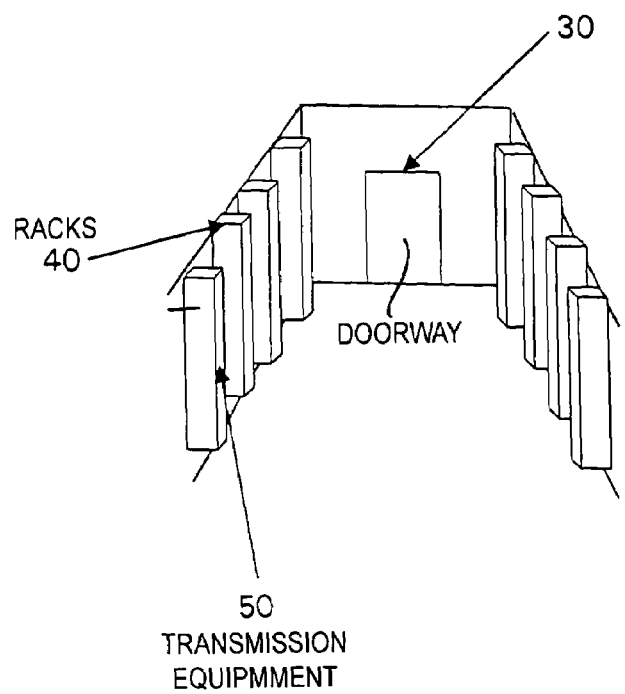
FIG. 2 shows a schematic view of the interior of a structure according to the present invention.

FIG. 1 shows a schematic view of the exterior of a structure according to an exemplary embodiment of the present invention. Structure 10 comprises a plurality of access ports 20 which are located around the perimeter of the structure; access to the interior is possible through doorway 30. Inside the structure (see FIG. 2) are a plurality of racks 40 which contain transmission equipment 50. The transmission equipment 50 is connected to externally located transmission cables 60 via interior pigtails 70 and exterior spur cables 75. Each of the exterior spur cables are connected to one of the interior pigtails at one of the access ports, with the exterior spur cables being connected to the transmission cables in a conventional manner. Alternatively, each interior pigtail may have a direct connection to one of the transmission cables with the connection being made at one of the access ports. Additionally, a radio antenna 80, for example for a point-to-point communications link or for a cellular radio communications network, may be located on top of the structure with a connection to respective transmission equipment via an interior pigtail.

One of the problems that has been observed when attempting to install new equipment into exchange buildings is that the installation must take place around existing equipment, which leads to significant compromises being made regarding the location of equipment racks and the internal cabling required to connect the equipment. These compromises can lead to increased installation times and cost.

The transmission equipment 50 is arranged such that each rack 40 contains the same type of transmission equipment, for example DSL linecards. The various input and output communication links, whether they are fibre or copper, can then be aggregated to form an interior pigtail which is routed through an adjacent access port for connection to an external cable. The aggregation of the links, for example to form a fibre ribbon, allows the interior pigtail to be connected to an external cable with the minimum of intervention. The routing of the pigtail from the rear of the transmission equipment to an access portal without leaving the rack effectively eliminates the need for cable management inside the structure, leading to a more cost effective and reliable solution.

The interior pigtails are connected to an external cable at an access port (either directly to a transmission cable 60 or to an external spur cable 75). Depending upon the number and type of transmission cards held in the associated rack, there may be more than one interior pigtail for connection to an external cable. In this case the size of the interior pigtails (i.e. the number of fibres in a fibre ribbon) should be matched to the size of the cable elements that the pigtails will be connected to. To try to reduce the possibility of confusion, each access portal may have separate and clearly defined portions for input cables and output cables (or this may also be achieved by having separate access portals for input cables and output cables.

Each access portal comprises clamps or grips to secure both the external cable and the interior pigtails and storage for the splice(s) or connection(s) between the various cables. Preferably separate storage is provided for the splice(s) or connection(s) for the input cables and for the output cables. The access portal is preferably provided with a sealable, locking lid that protects the clamps and the storage from the effects of the environment and offers some protection from malicious damage. The external cables may be simply attached to the exterior of the structure or routed through ducting. It should be possible for the aperture through which the pigtails leave the structure to be securely blocked, for example through being filled with a substance such as epoxy resin (although it is preferred if the substance could be removed to enable removal or replacement of the interior pigtails). The access portals are provided at a height on the outside of the structure that allows for comfortable working from the exterior from either a sitting or a standing position.

It is preferred that the doorway leading into the structure can be sealed and it is further preferred that the access to the interior of the structure is controlled by the manufacturer of the transmission equipment or the supplier, that intergrated the transmission equipment, the racks and the structure. This means that the network operator does not have access to the transmission equipment, so that any liability for equipment failure and operations and maintenance interventions remains with the supplier of the structure. There is an additional advantage that the use of the interior space of the structure can be used optimally and the minimal amount of internal cabling greatly increases the spatial efficiency with which the transmission equipment can be provided when compared with conventional exchange solutions. As a further alternative the structure can be provided with more than one doorway and the interior space of the structure can be securely partitioned so that the structure can be shared between more than one network operator. This may be of value when sharing antenna sites for third generation cellular radio networks.

The network operator specifies the type and quantity of transmission equipment required in the structure and provides the network infrastructure to connect the transmission equipment to the different sectors of the network operator's network(s) and any other necessary infrastructure (e.g. electrical power, air conditioning, etc.). It is believed by the inventors that the structure can be located on a simple concrete plinth. Alternatively, if it is necessary for a number of structures to be co-located then the structures may be stacked on top of each other or stored within some form of racking system. A preferred option for the structure is the containers which are used in the shipping and transportation industry as they come in a number of standard sizes, are physically robust to reduce the risks of physical damage to the transmission equipment from outside forces and are easily transportable to installation locations.

It would be clear to a person skilled in the art that many variants of the structure are possible, for example, structures having dish antennae and transmission equipment for satellite uplinks and/or downlinks, optical fibre transmission equipment for a fibre overly network (either for an ultra-fast transmission rate core network or for fibre to the home (FTTH)), linecards and infrastructure to support VDSL (Very high speed Digital Subscriber Line) or other flavours of DSL, etc.

The invention claimed is:

1. A portable structure for a communications network, the structure being sealable and comprising:
   transmission equipment for transmitting and receiving signals, the transmission equipment being located solely on interior walls of the structure;
   a plurality of sealable access ports formed in exterior walls of the structure; and
   one or more transmission media for connecting said transmission equipment to a communications network such that,
   the transmission equipment is connected to a first end of one or more of the transmission media and each of the one or more transmission media passes through one or more of the sealable access ports;
   wherein, in use, the structure is sealed and a network operator only has access to a second end of the one or more transmission media which is located outside the sealable structure.

2. A portable structure according to claim 1, wherein the structure has one or more entrance and the interior of the structure is partitioned such that each entrance has a dedicated area of the interior.

3. A portable structure according to claim 1 wherein the transmission media are copper cables and the transmission equipment is digital subscriber line equipment.

4. A portable structure according to claim 1 wherein at least one of the transmission media is connected to an antenna and the transmission equipment is cellular radio transmission equipment.

5. A portable structure according to claim 1, wherein the structure additionally comprises one or more housings to protect the plurality of access ports formed in exterior walls of the structure.

* * * * *